United States Patent
Moysi et al.

(10) Patent No.: US 10,305,861 B2
(45) Date of Patent: May 28, 2019

(54) CROSS-TENANT DATA LEAKAGE ISOLATION

(71) Applicant: Microsoft Technology Licensing, LLC., Redmond, WA (US)

(72) Inventors: Liran Moysi, Ramat Gan (IL); Noam Liran, Hertzliya (IL)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 186 days.

(21) Appl. No.: 15/249,554

(22) Filed: Aug. 29, 2016

(65) Prior Publication Data

US 2018/0063089 A1 Mar. 1, 2018

(51) Int. Cl.
*H04L 29/06* (2006.01)
*G06F 17/30* (2006.01)
(Continued)

(52) U.S. Cl.
CPC .... *H04L 63/0281* (2013.01); *G06F 17/30498* (2013.01); *G06F 17/30952* (2013.01);
(Continued)

(58) Field of Classification Search
CPC . H04L 63/0281; H04L 63/1408; H04L 63/10; G06F 21/6218; G06F 17/30498;
(Continued)

(56) References Cited

U.S. PATENT DOCUMENTS 6,587,854 B1 * 7/2003 Guthrie ............ G06F 17/30471
6,594,656 B1    7/2003 Arlein et al.
(Continued)

FOREIGN PATENT DOCUMENTS

| CN | 102682044 A | 9/2012 |
|---|---|---|
| WO | 2000051031 A1 | 8/2000 |
| WO | 2009055543 A1 | 4/2009 |

OTHER PUBLICATIONS

Schiller, et al., "Native Support of Multi-tenancy in RDBMS for Software as a Service", In Proceedings of the 14th International Conference on Extending Database Technology, Mar. 22, 2011, pp. 117-128.
(Continued)

*Primary Examiner* — Nelson Giddins
(74) *Attorney, Agent, or Firm* — M&B IP Analysts, LLC

(57) ABSTRACT

A method and proxy device for cross-tenant data leakage isolation in a multi-tenant database are provided. The method includes monitoring, by a proxy device, traffic flows between a server executing at least one cloud-based application and the multi-tenant database, wherein the proxy device is communicatively connected between the server and the multi-tenant database; capturing, by the proxy device, at least a request to access the multi-tenant database, wherein the request is communicated using a database-specific protocol; analyzing the request to determine if the request is legitimate; upon determining that the request is not legitimate, modifying the request to point to a global-tenant table and to designate a unique tenant identifier, wherein the unique tenant identifier corresponds to a tenant-specific table name designated in the global-tenant table; and sending the modified request to the multi-tenant database using the database-specific protocol.

22 Claims, 6 Drawing Sheets

(51) Int. Cl.
  *G06F 21/60* (2013.01)
  *G06F 21/62* (2013.01)
(52) U.S. Cl.
  CPC ...... *G06F 17/30964* (2013.01); *G06F 21/604* (2013.01); *G06F 21/6218* (2013.01); *H04L 63/10* (2013.01); *H04L 63/1408* (2013.01); *G06F 17/30448* (2013.01)
(58) Field of Classification Search
  CPC ......... G06F 17/30964; G06F 17/30952; G06F 17/30448; G06F 21/604
  See application file for complete search history.

(56) References Cited

U.S. PATENT DOCUMENTS

| | | | |
|---|---|---|---|
| 7,921,299 | B1 | 4/2011 | Anantha et al. |
| 8,260,964 | B2 | 9/2012 | Marmor |
| 8,291,490 | B1 | 10/2012 | Ahmed et al. |
| 8,365,270 | B2 | 1/2013 | Webb-Johnson |
| 8,473,594 | B2 | 6/2013 | Astete et al. |
| 8,799,320 | B2 | 8/2014 | Chan et al. |
| 8,849,793 | B2 | 9/2014 | Vexler |
| 9,081,805 | B1 | 7/2015 | Stamen et al. |
| 9,081,835 | B2 | 7/2015 | Hind et al. |
| 9,276,942 | B2 | 3/2016 | Srinivasan et al. |
| 2009/0113031 | A1* | 4/2009 | Ruan ................. H04L 41/00 709/223 |
| 2009/0254572 | A1* | 10/2009 | Redlich ............... G06Q 10/06 |
| 2011/0161656 | A1 | 6/2011 | Rao |
| 2011/0270886 | A1 | 11/2011 | An et al. |
| 2012/0246696 | A1* | 9/2012 | Boukobza ........... G06F 21/6227 726/1 |
| 2012/0304189 | A1* | 11/2012 | Tominaga ............ G06F 3/0622 718/104 |
| 2013/0018988 | A1 | 1/2013 | Peek |
| 2013/0124475 | A1* | 5/2013 | Hildenbrand ..... G06F 17/30351 707/636 |
| 2013/0174242 | A1* | 7/2013 | Snow ............... H04N 21/41407 726/7 |
| 2014/0032228 | A1* | 1/2014 | Johri ................... G06F 21/6227 705/1.1 |
| 2014/0130175 | A1* | 5/2014 | Ramakrishnan .. G06F 17/30286 726/26 |
| 2014/0280492 | A1* | 9/2014 | Yang ....................... A63F 13/00 709/203 |
| 2014/0331337 | A1* | 11/2014 | Factor ..................... G06F 21/62 726/30 |
| 2015/0135302 | A1* | 5/2015 | Cohen ................. H04L 67/2823 726/12 |
| 2016/0004716 | A1* | 1/2016 | Akirav .............. G06F 17/30156 707/692 |
| 2016/0094486 | A1* | 3/2016 | Sahoo ................. H04L 67/2833 709/226 |
| 2016/0142506 | A1* | 5/2016 | Sahoo ................. H04L 67/2804 709/226 |
| 2017/0142068 | A1* | 5/2017 | Devarajan ............. H04L 43/028 |
| 2017/0177698 | A1* | 6/2017 | Lee ................... G06F 17/30477 |

OTHER PUBLICATIONS

Hingwe, et al., "Hierarchical Role-Based Access Control with Homomorphic Encryption for Database as a Service", In Journal of Computing Research Repository, Mar. 2016, 11 pages.

"International Search Report and Written Opinion Issued in PCT Application No. PCT/US2017/047874", dated Nov. 3, 2017, 15 Pages.

"MaxScale as a Replication Proxy", Retrieved from https://mariadb.com/kb/en/mariadb-enterprise/mariadb-maxscale-14/maxscale-as-a-replication-proxy/, 7 Pages.

"MySQL Proxy", Retrieved from https://downloads.mysql.com/docs/mysql-proxy-en.pdf, Oct. 8, 2008., 54 Pages.

"Proxy Authentication", Retrieved from https://docs.oracle.com/cd/B28359_01/java.111/b31224/proxya.htm, Jan. 10, 2012, 6 Pages.

* cited by examiner

FIG. 2A

CROSS-TENANT DATA LEAKAGE ISOLATION

BACKGROUND

In recent years, an increasing number of providers have been offering the ability to create computing environments in the cloud. For example, in 2006, Amazon Web Services™ (also known as AWS) launched a service that provides users with the ability to configure an entire environment tailored to an application executed over a cloud-computing platform. In general, such services allow for developing scalable applications in which computing resources are utilized to support efficient execution of the application.

Organizations and businesses that develop, provide, or otherwise maintain cloud-based applications have become accustomed to relying on these services and implementing various types of environments, from complex websites to applications and services provided via software-as-a-service (SaaS) delivery model. Such services and applications are collectively referred to as "cloud-based applications." Cloud-based applications are typically accessed by users using a client device via a web browser.

Cloud-based applications are typically programmed to support multi-tenancy access or resource sharing. A multi-tenancy is an architecture in which a single instance of a software application (e.g., a cloud-application) serves multiple customers. A customer is a tenant. Tenants may customize some resources of the application, such as color of the user interface (UI) or business rules, but they cannot customize the application's code.

As such, some resources of a cloud-based application are shared. One resource that is frequently shared is a database. That is, internal database tables are shared across all or some of the tenants utilizing services provided by the application.

The multi-tenancy architecture as utilized by cloud-based applications is vulnerable, as cross-tenant information can be shared among tenants either accidentally or maliciously. That is, a client of one tenant may be granted access to information stored in the shared database that belongs to a different tenant. Thus, one of the common vulnerabilities associated with such an architecture is data leakage.

As greater reliance is made on cloud-based applications, the access to such applications from a web browser must be completely secured. For example, a banking application should be secured to prevent any data leakage between tenants.

Existing solutions for defense of resources of cloud-based applications are limited to protecting the infrastructure. For example, security solutions, such as intrusion detection, access controls, and network firewalls may block access to the shared-resource (e.g., database) from clients that do not belong to any tenant permissible to access the database. However, such solutions are incapable of blocking cross-tenant access, as all tenants are permitted access to the shared resource.

One solution for cross-tenant isolation when accessing a database is based on either a physical or logical separation of data stored in the database. The physical separation requires using different physical databases (hosted on different servers or virtual machines), each of which is allocated for a specific tenant. The logical separation requires maintaining data of different tenants in different tables within the database.

Both physical and logical separation solutions are not scalable and efficient, because as the number of tenants grows, more computing resources are required. Specifically, for some tenants, the amount of stored data is minimal, while the overhead of maintaining a separate table or database is too high. Thus, such solutions are not optimized to provide good performance, particularly for higher numbers of tenants. Further, the physical and logical separation solutions are also vulnerable as access controls are typically not strictly enforced by the tenant. For example, a user from a first tenant can access a table of a second tenant simply by designating table's name of a second tenant. This can be achieved by, for example, an SQL injection. Using this type of attack, a user (or hacker) can inject a code to override any identifier (e.g., table ID or tenant ID) utilized for the logical separation, and thus access data of any tenant in the database.

It would therefore be advantageous to provide a solution that would overcome the deficiencies noted above by preventing data leakage vulnerabilities in cloud-based applications supporting multi-tenancy.

SUMMARY

This Summary is provided to introduce a selection of concepts in a simplified form that are further described below in the Detailed Description. This Summary is not intended to identify key features or essential features of the claimed embodiments, nor is it intended to be used to limit the scope of the various claimed embodiments. Moreover, the sole purpose of this Summary is to present some concepts of one or more embodiments in a simplified form as a prelude to the more detailed description that is presented later. For convenience, the term "some embodiments" or "various embodiments" may be used herein to refer to a single embodiment or multiple embodiments of the disclosure.

Some embodiments disclosed herein include a method for cross-tenant data leakage isolation in a multi-tenant database. The method comprises monitoring, by a proxy device, traffic flows between a server executing at least one cloud-based application and the multi-tenant database, wherein the proxy device is communicatively connected between the server and the multi-tenant database; capturing, by the proxy device, at least a request to access the multi-tenant database, wherein the request is communicated using a database-specific protocol; analyzing the request to determine if the request is legitimate; upon determining that the request is not legitimate, modifying the request to point to a global-tenant table and to designate a unique tenant identifier, wherein the unique tenant identifier corresponds to a tenant-specific table name designated in the global-tenant table; and sending the modified request to the multi-tenant database using the database-specific protocol.

Some embodiments disclosed herein also include a non-transitory computer readable medium having stored thereon instructions for causing one or more processing units to execute a process for: monitoring, by a proxy device, traffic flows between a server executing at least one cloud-based application and the multi-tenant database, wherein the proxy device is communicatively connected between the server and the multi-tenant database; capturing, by the proxy device, at least a request to access the multi-tenant database, wherein the request is communicated using a database-specific protocol; analyzing the request to determine if the request is legitimate; upon determining that the request is not legitimate, modifying the request to point to a global-tenant table and to designate a unique tenant identifier, wherein the unique tenant identifier corresponds to a tenant-specific table name designated in the global-tenant table; and sending the modified request to the multi-tenant database using the database-specific protocol.

Some embodiments disclosed herein also include a proxy device for cross-tenant data leakage isolation in a multi-tenant database, the proxy device is communicatively connected between a server executing a cloud-based application and the multi-tenant database. The proxy device comprises a processing circuitry; and a memory, the memory containing instructions that, when executed by the processing circuitry, configure the proxy device to: monitor traffic flows between the server and the multi-tenant database; capture at least a request to access the multi-tenant database, wherein the request is communicated using a database specific protocol; analyze the request to determine if the request is legitimate; modify the request to point to a global-tenant table and designate a unique tenant identifier, upon determination that the request is not legitimate, wherein the unique tenant identifier corresponds to the tenant-specific table name designated in the global-tenant table; and send the modified request to the multi-tenant database using the database specific protocol.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

FIGS. 2A and 2B are example tables illustrating the creation of a global tenant table according to one embodiment.

DETAILED DESCRIPTION

Figure 1:
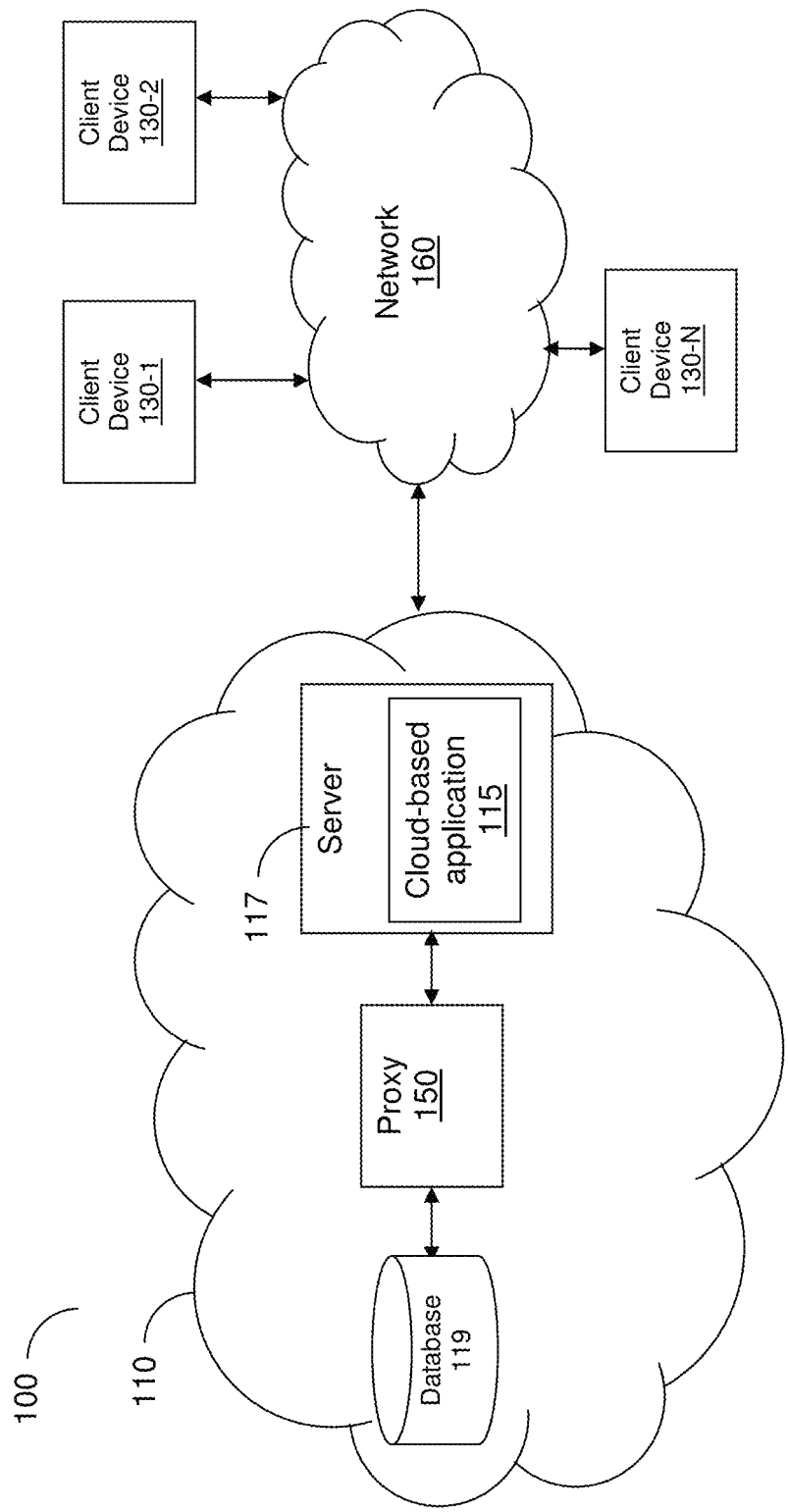
FIG. 1 is a network diagram utilized to describe the disclosed embodiments.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

By way of example and without limitation, a system and method for cross-tenant data leakage isolation in databases accessed by cloud-based applications are provided. The cross-tenant isolation is achieved by enforcing an access to a shared-resource only to permissible tenants. The shared-resource is of a cloud-based application that supports a multi-tenancy architecture. The disclosed embodiments further improve the performance of managing access to the shared-resource, and specifically to a database.

FIG. 1 is an example network diagram of a communication system 100 utilized to describe the various disclosed embodiments. The system 100 includes a cloud computing platform 110 which may be a private cloud, a public cloud, or a hybrid cloud providing computing resources to applications or services executed therein.

In the example FIG. 1, a cloud-based application 115 is executed in the cloud computing platform 110 by a server 117. The cloud-based application 115 may include, but is not limited to, an e-commerce application, a collaboration application, an office and messaging application, a social media application, an enterprise application, a gaming application, a media sharing application, and the like. The server 117 may be an application server, a web server, and the like, and can be realized as a virtual machine or a physical machine.

The server 117 is communicatively connected to at least one shared-resource. In an embodiment, the shared resource is a database 119 configured to maintain data belonging to a plurality of different tenants. The cloud-based application 115 supports a multi-tenancy architecture. That is, different client devices 130-1 through 130-*n* are operable by users associated with different tenants can use the application 115 and access the database 119. As an example, a user of a client device 130-1 may be part of a tenant A while a user of a client device 130-2 may be part of a tenant B. Both client devices 130-1 and 130-2 can access the application 115 and the database 119 for the purpose of retrieving, saving, or updating data, or a combination thereof.

A client device 130 may include, for example, a personal computer, a laptop, a tablet computer, a smartphone, a wearable computing device, or any other computing device. The connection between the client devices 130 and the cloud computing platform 110 is over a network 160. The network 160 may be a wired or wireless network, a wide area network (WAN), a local area network (LAN), the Internet, and the like.

The database 119 may be a table-based relational database structure or non-relational database that operates on dynamic schemas. For example, the database 119 may include MongoDB®, Apache Cassandra, Redis, Oracle®, Sybase®, Microsoft SQL Server®, Access®, Ingres®, and the like.

The data in the database 119 is organized based on a schema (which may be relational or dynamic). A database schema is the skeleton structure that represents the logical view of the entire database. The database schema defines how the data is organized, how the relations among the data are associated, and formulates all the constraints that are to be applied on the data.

In an embodiment, the database schema of the database 119 is structured to include a global tenant table (not shown). The global tenant table is a joint of all tables maintained for all tenants supported by the cloud-based application 115. In order to allow isolation of data belonging to different tenants, a unique tenant ID is assigned for each tenant. A tenant ID is then associated with each table that a respective tenant can access.

In an example embodiment, such association may be realized by adding a tenant ID column to each table and designating the tenant ID's value in a respective column. It should be noted that a table of a specific tenant may include a schema or a service defined by a specific table.

Figure 2A:
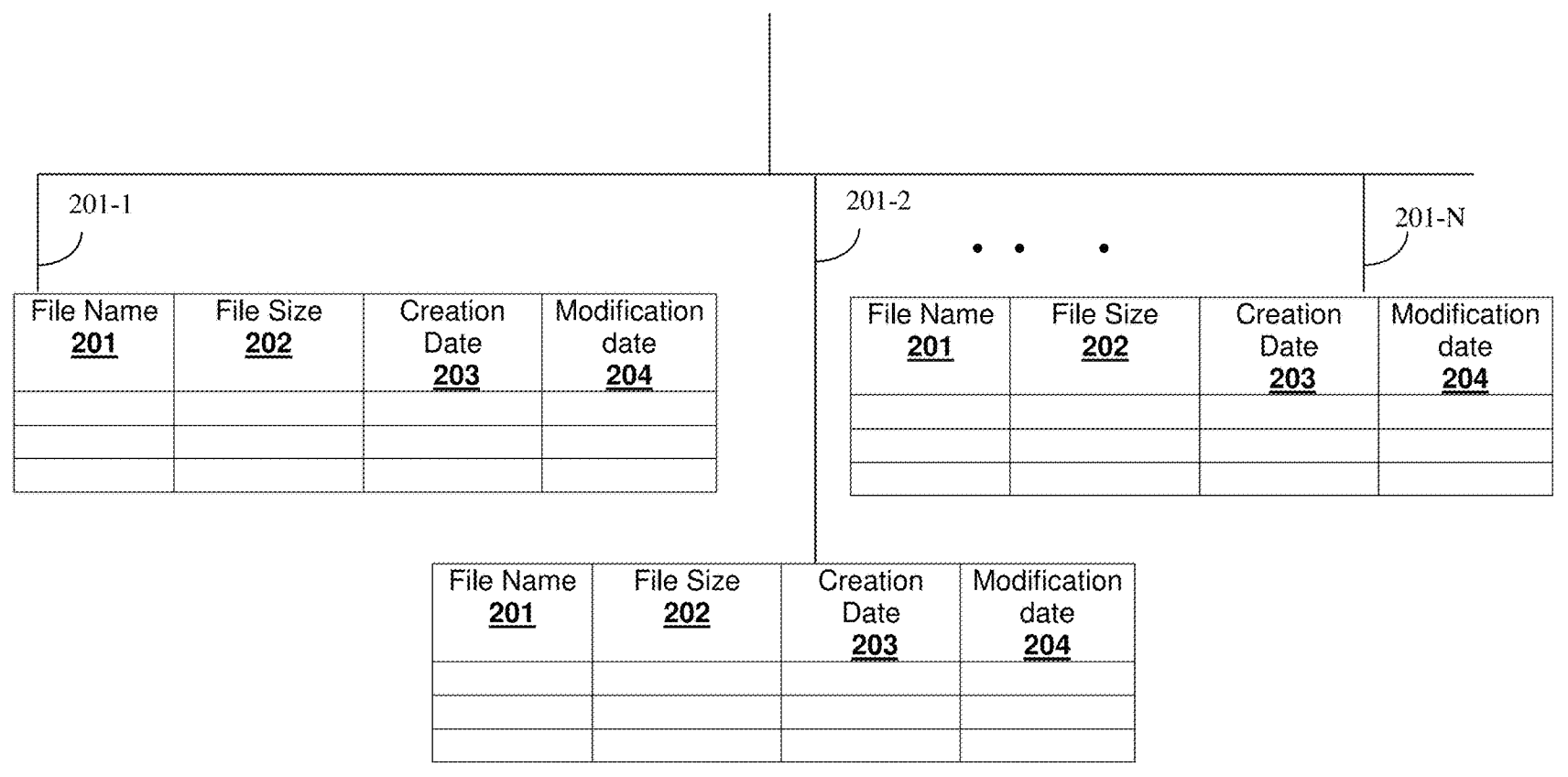
Figure 2B:
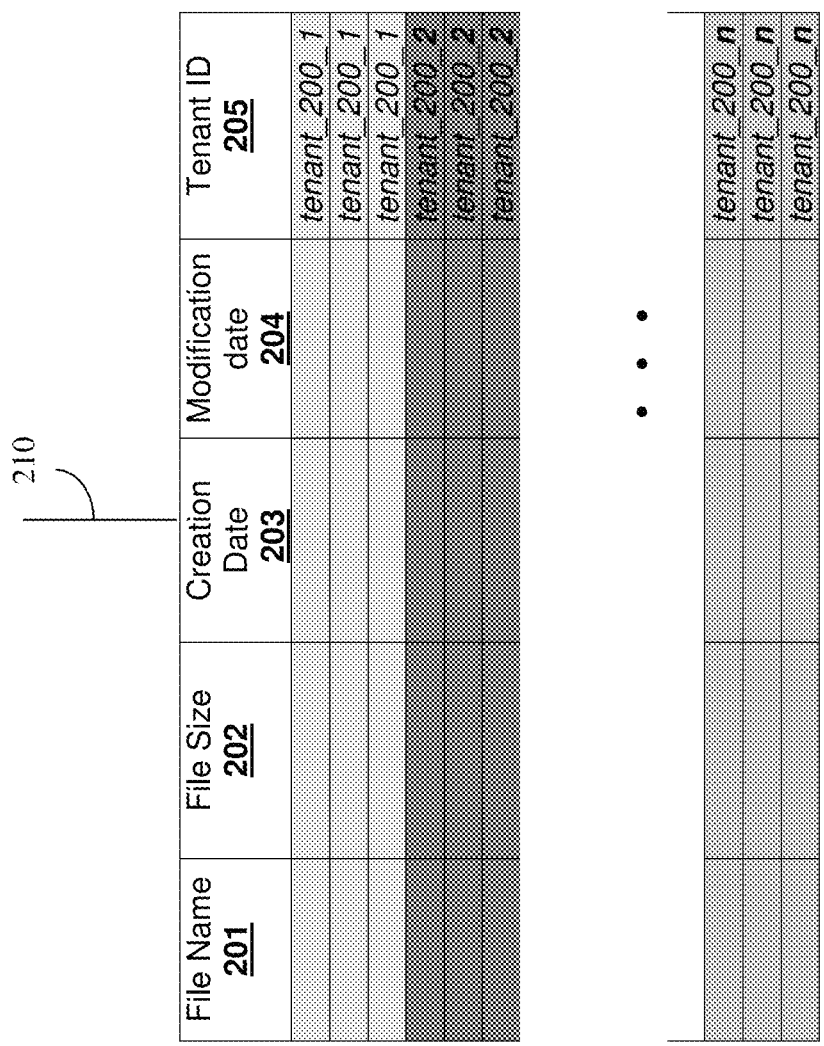

The creation of the global tenant table is further demonstrated in the example FIGS. 2A and 2B. FIG. 2A shows that the database schema defines 'n' file tables 200-1 through 200-*n* (n is an integer number greater than 1). Each file table 200-1 through 200-*n* is associated with a different tenant (not shown in FIG. 2). Further, each table 200-1 through 200-*n* includes 4 columns "file name" 201, "file size" 202, "creation date" 203, and "modification date" 204.

As illustrated in FIG. 2B, a global tenant table 210 is created by joining the tables 200-1 through 200-n into a single table 210 and adding a column 205 indicating a tenant ID. In these examples, the tenant IDs are tenant_200_1, tenant_200_2, . . . , tenant_200_n. That is, each entry from a table 200-i (i=1, 2, . . . , n) is designated using a respective tenant ID, i.e. tenant_200_i (i=1, 2, . . . , n).

Returning back to FIG. 1, the communication between the database 119 and the cloud-based application 115 may be facilitated using a communication protocol employed by the database 119. For example, the MongoDB® employs a MongoDB Wire protocol, which is a socket-based, request-response style protocol. As another example, the database is an ElasticSearch (or Elastic) database that employs an HTTP protocol.

According to the disclosed embodiments, a proxy 150 is communicatively connected between the server 117 and the database 119. The proxy 150 may be deployed inside or outside the cloud-computing platform as in-line or out-of-path deployment. In certain configurations, the proxy 150 is integrated in the database 119 and configured to tap communication on one of the database's 119 sockets.

In an embodiment, the proxy 150 is configured to monitor the traffic flows between the server 117 and the database 119 in order to enforce data isolation across tenants. Such traffic flows typically include requests to access the database 119 sent from the application server 117 and responses from the database 119 to the server 117. The responses and requests can be communicated using the communication protocol employed by the database 119. It should be noted that traffic flows typically include data related to other communication (transport) protocols (e.g., TCP/IP) as conventionally used in network communications.

According to the disclosed embodiments, the proxy 150 is configured to monitor the traffic flows to identify requests and responses to and from the database 119. A request to access the database 119 typically includes headers and a query. The headers may designate, for example, a request ID, a target table name, a type of expected response, a length of the request, and so on. Examples for requests are provided below. A response includes the returned data designated by its source in the database 119. The response may also include metadata designating, for example, a response ID, a corresponding request ID, a length of the response, and the like.

An identified request is further processed to determine if a query embedded therein is a legitimate query. In an embodiment, the proxy 150 is configured to parse the request to at least identify query elements, a target table of the query, and a command type of the query. In some embodiments, any header of the request may also be parsed to identify information that can be later utilized to process a corresponding response. For example, a request ID can be parsed out and stored. As another example, the tenant ID is parsed out from the name of the database or collection which resides in the header (e.g., fullCollectionName). In an example embodiment, the request can be parsed into a JavaScript object notation (JSON) format, a binary-script object notation (BSON) format, an Extensible Markup Language (XML) format, and the like.

In an embodiment, a query addressed to a global tenant table and to a specific tenant (designated by a tenant ID) within the global query table is a legitimate query. A legitimate query is relayed to the database 119. In a certain protocol, the table being accessed is designated in the request.

The proxy 150 is further configured to modify any not legitimate query. In an embodiment, the modification includes addressing the query to the global tenant table and specifying a condition with a specific tenant ID having permissions to access the table identified in the received query. As an example, if the original query was directed to table 200-1 (FIG. 2A), then the modified query would designate the tenant ID tenant_200_1 (FIG. 2B).

In another embodiment, the type of command of a query (not-legitimate or legitimate) is determined. Certain commands are also changed in order to protect the contents of the database. For example, a command for deleting an entire table is changed to a command for deleting certain records as to protect the global entry table.

Following is an example for modifying a query embedded in a request according to an embodiment. The following example request is in a format compliant with a MongoDB® Wire protocol.

```
{
  "flags" : 0,
  "fullCollectionName" : "table_2.users",
  "header" : {
    "messageLength" : 252,
    "opCode" : "OP_QUERY",
    "requestID" : 457936,
    "responseTo" : 0
  },
  "numberToReturn" : 0,
  "numberToSkip" : 0,
  "query" : {
    "$query" : {
      "effectiveTags" : {
        "$ne" : "56b9b67ee4b00a09b9a557cc"
      },
      "serviceData.11161.userStatusVal" : 2
    }
  }
}
```

The above request includes a not legitimate query being addressed to a specific table "table_2.users" and not to the global tenant table "AllTenants.users". The modification includes addressing the query (or request) to a global tenant table "AllTenants.users".

In addition, a condition is added to the query to access only records in the global tenant table related to a tenant (having a tenant ID "2") owns the table "table_2.users". The modified query (and request) is as follows:

```
{
  "flags" : 0,
  "fullCollectionName" : "AllTenants.users",
  "header" : {
    "messageLength" : 252,
    "opCode" : "OP_QUERY",
    "requestID" : 457936,
    "responseTo" : 0
  },
  "numberToReturn" : 0,
  "numberToSkip" : 0,
  "query" : {
    "$query" : {
      "_tid" : 2,
      "effectiveTags" : {
        "$ne" : "56b9b67ee4b00a09b9a557cc"
      },
      "serviceData.11161.userStatusVal" : 2
    }
  }
}
```

The additional condition is:
"$query":{
"_tid":2,

Following is another example for modifying a not legitimate query embedded in a request. In this example, the command type is changed to protect the global tenant table. The example request is as follows:

```
{
  "flags" : 0,
  "fullCollectionName" : "table_2.$cmd",
  "header" : {
    "messageLength" : 252,
    "opCode" : "OP_QUERY",
    "requestID" : 275696,
    "responseTo" : 0
  },
  "numberToReturn" : 0,
  "numberToSkip" : 0,
  "query" : {
    "drop" : "users"
  }
}
```

The above request includes a not legitimate query being addressed to a specific table "table_2.users" and not to a global tenant table. In addition, the query includes a "drop" command directed at deleting the contents users table. Execution of such command on the global tenant table will delete its contents.

The modified query (and request) is as follows:

```
{
  "flags" : 0,
  "fullCollectionName" : "AllTenants.$cmd",
  "header" : {
    "messageLength" : 310,
    "opCode" : "OP_QUERY",
    "requestID" : 275696,
    "responseTo" : 0
  },
  "numberToReturn" : 0,
  "numberToSkip" : 0,
  "query" : {
    "delete" : "users",
    "deletes": [ { "q" : { "_tid" : 2 } } ]
  }
}
```

The modification includes addressing the query (or request) to a global tenant table "AllTenants.users" and querying a global tenant table related to a tenant (having a tenant ID "2") owns the table "table_2.users". In addition, the query command "drop" is now "delete."

In another embodiment, the proxy 150 is configured to analyze the identified responses sent from the database 119 to determine if an identified response should be modified. Typically, such modification is required when the returned data in the response is related to the global tenant table and not to specific tables of specific tenants.

In an embodiment, a response is to be modified if the corresponding request includes a query command related to the entire database. The proxy 150 is configured to identify such queries and their corresponding responses. The responses are modified to at least inject data related to a table of a specific tenant.

As non-limiting examples, query commands, such as "list databases" and "list indexes" utilized by the Wire protocol, would trigger a change in the response.

In an embodiment, the proxy 150 is configured to record a request ID of each request including such query commands and to search for the requested ID in the response. If such a response is identified, a name-specific table (not the global tenant table) that the request is originally addressed to is injected into the response and associated with the retrieved data (if such exists).

Following is a non-limiting example for the modification of a response triggered by "command databases". The response received from the database 119 is as follows:

```
[{
    "databases" : [{
        "name" : "AllTenants",
        "sizeOnDisk" : 8.388608E7,
        "empty" : false
    }, {
        "name" : "local",
        "sizeOnDisk" : 8.388608E7,
        "empty" : false
    }, {
        "name" : "sadams",
        "sizeOnDisk" : 8.388608E7,
        "empty" : false
    }, {
        "name" : "test",
        "sizeOnDisk" : 8.388608E7,
        "empty" : false
    }
    ],
    "totalSize" : 3.3554432E8,
    "ok" : 1.0
}
]
```

The response designates the global tenant table ""name": "AllTenants"" and is not specific to table names of specific tenants. The modified response is as follows:

```
[{
    "databases" : [{
        "name" : "local",
        "sizeOnDisk" : 8.388608E7,
        "empty" : false
    }, {
        "name" : "test" ,
        "sizeOnDisk" : 8.388608E7,
        "empty" : false
    }, {
        "name" : "AllTenants",
        "sizeOnDisk" : 8.388608E7,
        "empty" : false
    }, {
        "name" : "Tenant_1",
        "sizeOnDisk" : 8.388608E7,
        "empty" : false
    }, {
        "name" : "Tenant_2",
        "sizeOnDisk" : 8.388608E7,
        "empty" : false
    }, {
        "name" : "Tenant_3",
        "sizeOnDisk" : 8.388608E7,
        "empty" : false
    }, {
        "name" : "Tenant_4",
        "sizeOnDisk" : 8.388608E7,
        "empty" : false
    }, {
        "name" : "Tenant_5",
        "sizeOnDisk" : 8.388608E7,
        "empty" : false
    }
    ],
    "totalSize" : 3.3554432E8,
    "ok" : 1.0
}
]
```

In the modified response, the tables' names of tenants 1 through 5 (e.g., "name": "Tenant_1", "name": "Tenant_2", etc.) are added to the response. For example, the injected code to designate the table of tenant 2 is as follows:

"name": "Tenant_2",
"sizeOnDisk": 8.388608E7,
"empty": false

The above examples are based on the MongoDB Wire® Protocol. It should be appreciated that one of ordinary skill can easily adapt these examples using the disclosed embodiments to modify requests and responses compliant with other types of database communication protocols.

The ability to maintain a single table in the database 119 for all tenants improves the performance of the database 119 and the cloud-based application 115. Specifically, maintenance of a single table does not require having a memory instance for each table in the database. In addition, at least one optimization process for optimizing the performance when accessing, maintaining, or both accessing and maintaining a single database can be applied. Such an optimization process may include, but is not limited to, sharding and scaling database tables. Sharding is a process of storing data records of a single table across multiple machines. As the size of the table increases, a single machine may not be sufficient to store the data nor to provide an acceptable read and write throughput. Thus, sharding may be utilized to ensure the ability to store the entire table and to access the table in more efficiently.

It should be noted that, although one cloud-based application 115 and one database 119 are depicted in FIG. 1 merely for the sake of simplicity, the embodiments disclosed herein can be applied to a plurality of client devices, a plurality of cloud-based applications, or both.

It should be further noted that the embodiments disclosed herein are not limited to the specific architecture illustrated in FIG. 1 and other architectures may be equally used without departing from the scope of the disclosed embodiments. Specifically, the proxy 150 may reside in the cloud computing platform 110, in a different cloud computing platform, or in a connectable datacenter. Moreover, in an embodiment, there may be a plurality of proxies 150 operating as described hereinabove and configured to either have one as a standby proxy to take control in a case of failure, to share the load between them, or to split the functions between them. Furthermore, without departing from the scope of the disclosed embodiments, various functions of the proxy 150 may be implemented by either the server 117 or the database 119.

Figure 3:
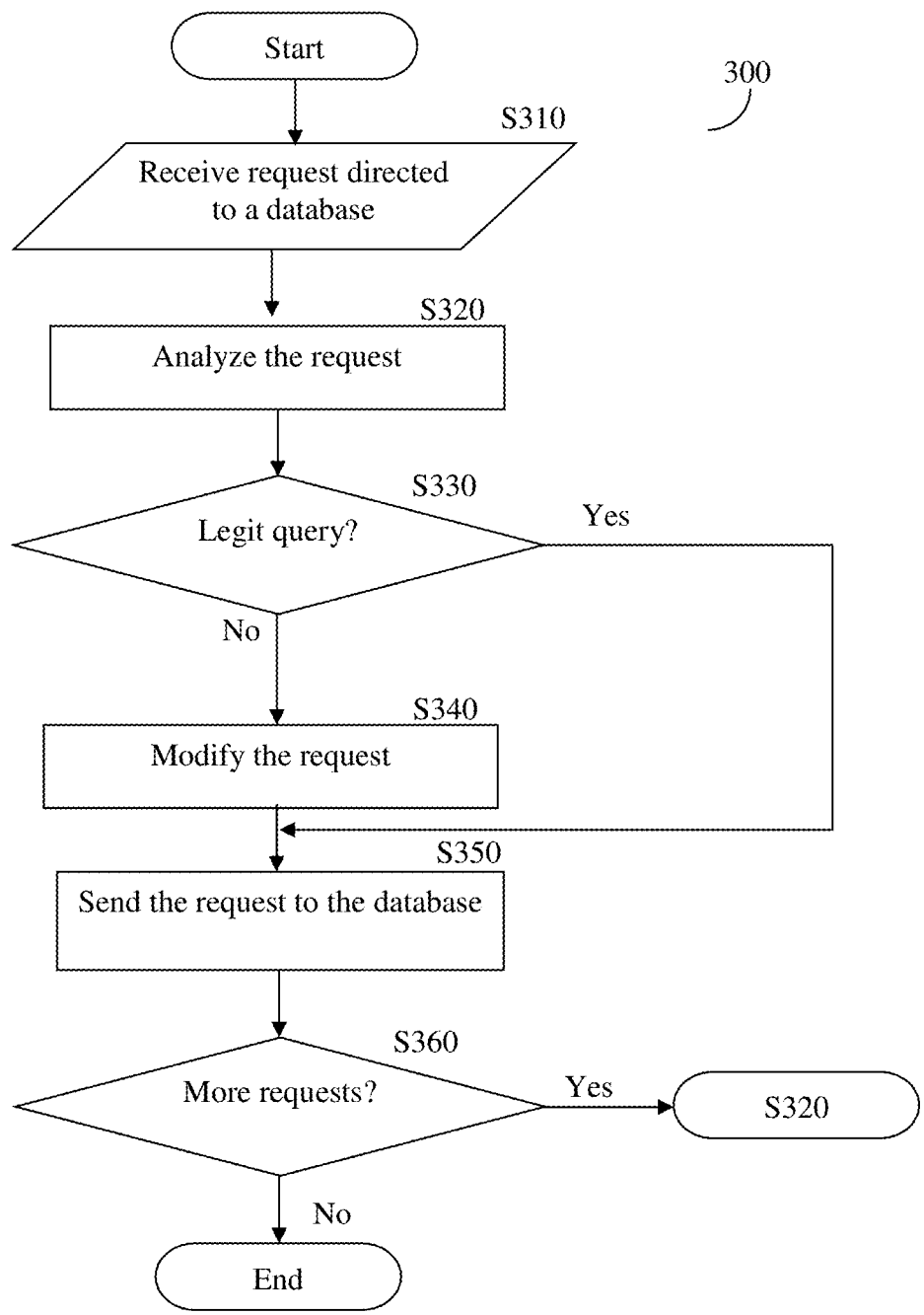
FIG. 3 is a flowchart illustrating a method for enforcing cross-tenant data leakage isolation in a database accessed by a cloud-based application according to an embodiment.

FIG. 3 depicts an example flowchart 300 illustrating a method for cross-tenant data leakage isolation in a database accessed by a cloud-based application according to an embodiment. The method discussed herein is directed at handling requests.

The method operates on a database that maintains at least one global tenant table for all tenants that can access the contents of the database. In an embodiment, if such global tenant table does not exist, then a process for creating a global tenant table by joining database tables of all tenants is performed. The creation of a global tenant table is discussed above. The method discussed herein is directed at handling requests.

At S310, a request sent from a cloud-based application to the database is received or otherwise captured. The request is received in a communication format or using protocol supported by the database. Examples for such communication protocols are provided above.

At S320, the request is analyzed to identify any query embedded therein. In an embodiment, S320 includes parsing the request to at least identify query elements, a target table of the query, and a command type of the query. In some embodiments, any header of the request may be also parsed to identify information that can be later utilized to process a corresponding response. For example, a request ID can be parsed out and stored. As another example, the tenant ID is parsed out from the name of the database or collection which resides in the header (e.g., fullCollectionName). The tenant ID is conveyed to the query.

In an embodiment, the request can be parsed into a JavaScript object notation (JSON) format, a binary-script object notation (BSON) format, an Extensible Markup Language (XML) format, and the like.

At S330, it is checked if the identified query is legitimate. If so, execution proceeds to S350 where the request is sent to the database; otherwise, execution continues with S340. In an embodiment, a query is legitimate if the query is addressed to a global tenant table of the database and to a specific tenant (designated by a tenant ID) that is within the global query table. In a further embodiment, a legitimate query does not include a command that can delete, destroy, or obscure the global tenant table.

In another embodiment, a legitimate query is a query addressed to the global tenant table sent from an authorized client device. A client device can be authorized if the query includes an authentication token, e.g., a cookie. This ensures that queries that must execute for all tenants are sourced only from an authorized client device. It should be noted that a combination of the above-mentioned legitimate query requirements or qualifications may be utilized, for example, a legitimate query may be a query that is both addressed to a global tenant table of the database and to a specific tenant designated in the global query table as well as sent from an authorized device.

At S340, the query (and hence the captured request) are modified in order to enforce a strict access to only a table or tables of a specific tenant. In an embodiment, S340 includes addressing the query to the global tenant table and adding a condition designating the tenant ID of the specific tenant. As noted above, the global tenant query includes the tables of all tenants, each identified by a unique tenant ID. Thus, including the tenant ID as a condition in the query ensures that only records in a table belonging to a specific tenant can be accessed by that tenant. Therefore, the modified query and request ensure cross-tenant data isolation. Examples for modifying requests are provided above.

At S360, it is checked if additional requests have been received or captured, and if so execution returns to S320; otherwise, execution terminates.

Figure 4:
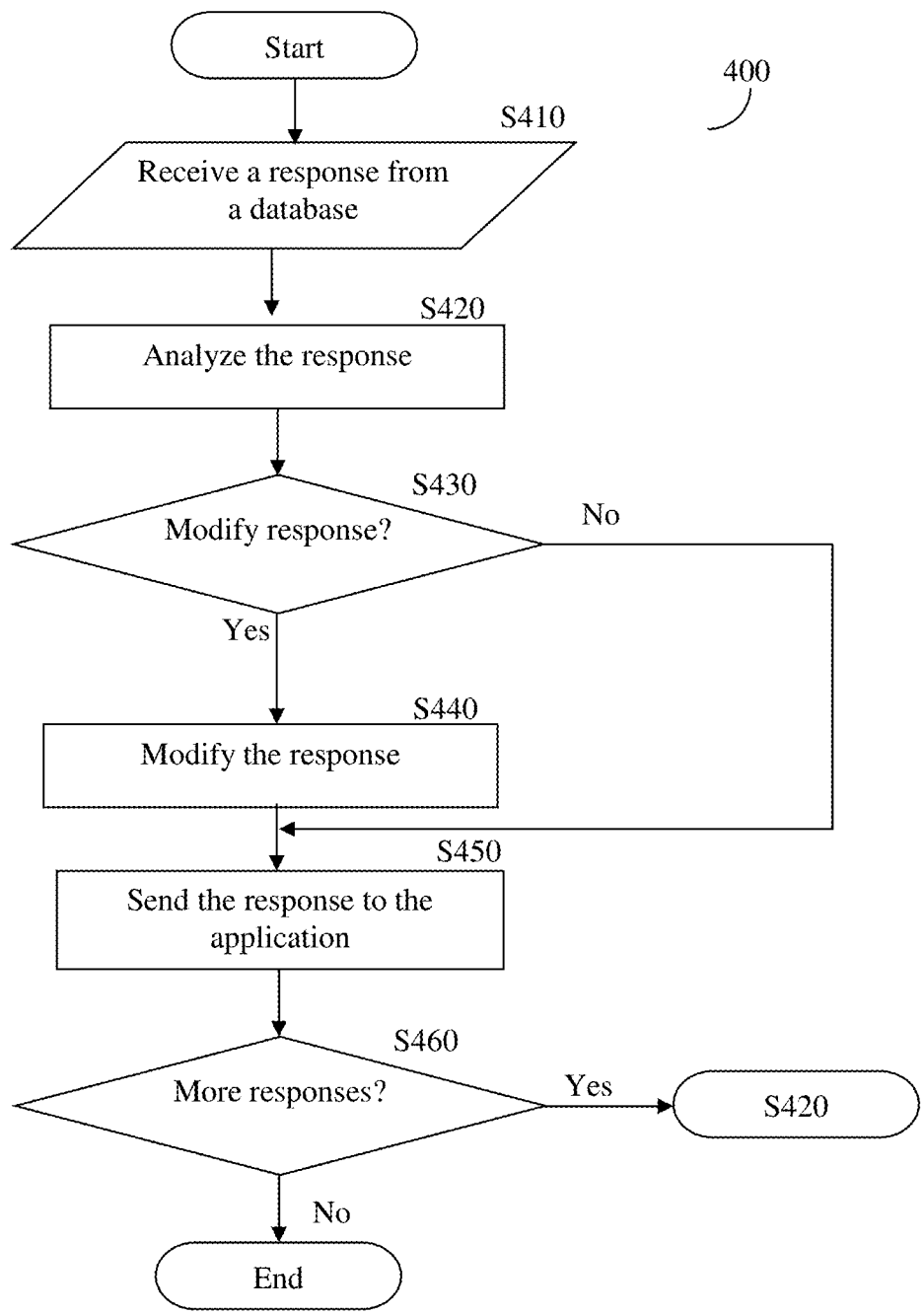
FIG. 4 is a flowchart illustrating a method for handling responses generated by a database maintaining a global tenant table according to an embodiment.

FIG. 4 depicts an example flowchart 400 illustrating a method for handling responses generated by a database maintaining a global tenant table according to an embodiment.

At S410, a response sent from a database to a cloud-based application is received or otherwise captured. The response received is in a communication format or utilizing a protocol supported by the database. Examples for such communication protocols are provided above.

At S420, the response is analyzed. In an embodiment, S420 includes parsing the request to at least identify a command type and a corresponding request. The response can be parsed into a JavaScript object notation (JSON) format, a binary-script object notation (BSON) format, an XML format, and the like.

At S430, it is checked if the command type requires a modification of the response. If so, execution continues with S440; otherwise, execution proceeds to S450, where the response is sent to the cloud-based application. In an embodiment, a predefined list of command types that would require modification of the response is maintained. The identified command-type is compared to such a list. In another embodiment, requests having corresponding responses requiring modification are cached. Upon encountering a matching response (based on the request ID in the response's header field), the request is retrieved from the cache and the response is modified accordingly.

At S440, the response is modified based on the identified command type. The information to be included in the response is determined, in part, based on the corresponding request identified by the requested ID. In an embodiment, the modification of the response ensures that data included in the response will be associated with a specific table of a tenant and not with the global tenant ID. A few examples for modifying responses are provided below.

At S460, it is checked if additional responses have been received or captured, if so execution returns to S420; otherwise, execution terminates.

Figure 5:
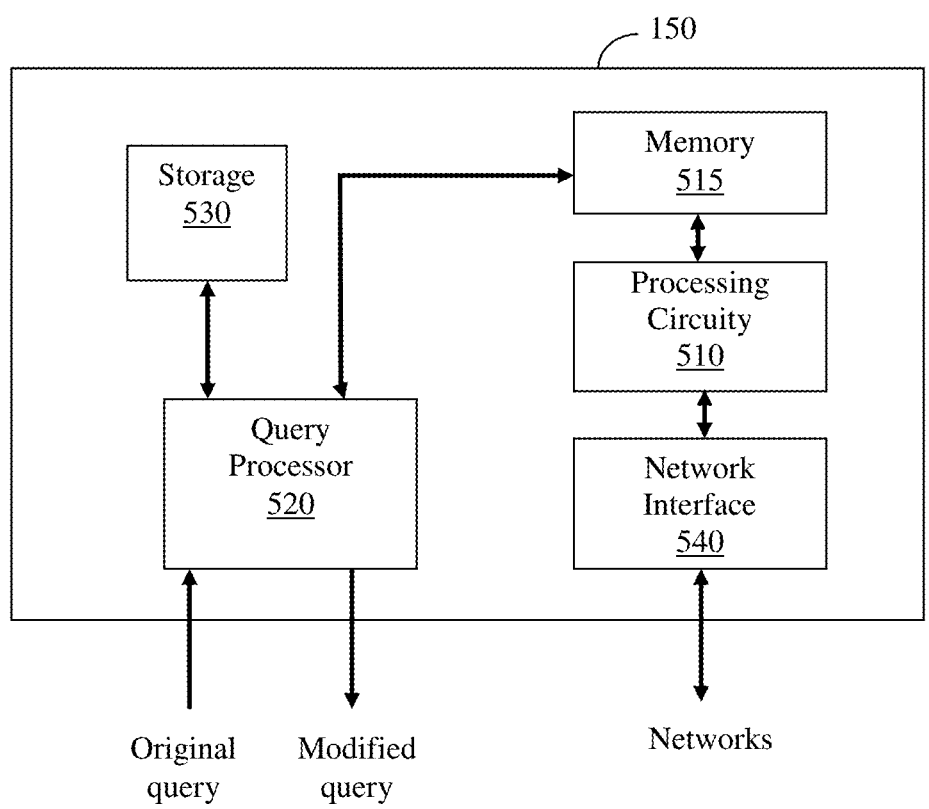
FIG. 5 is a block diagram of the proxy constructed according to one embodiment.

FIG. 5 shows an example block diagram of the proxy 150 constructed according to one embodiment. The proxy 150 may be deployed in cloud-computing platforms, data centers, or as a stand-alone network device. The proxy 150 is configured to at least enforce cross-tenant data leakage isolation in a database accessed by cloud-based applications as described in greater detail above. The proxy 150 includes a processing circuitry 510 coupled to a memory 515, a query processor 520, a storage 530, and a network interface 540.

The processing circuitry 510 may be realized by one or more hardware logic components and circuits. For example, and without limitation, illustrative types of hardware logic components that can be used include Field Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 515 may be volatile (e.g., RAM, etc.), non-volatile (e.g., ROM, flash memory, etc.), or a combination thereof.

The storage 530 may be magnetic storage, optical storage, and the like and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

In one configuration, computer readable instructions to implement one or more embodiments disclosed herein may be stored in the storage 530. The storage 530 may also store other computer readable instructions to implement an operating system, an application program, and the like. Computer readable instructions may be loaded in the memory 515 for execution by the processing circuitry 510. The storage 530 is configured to store, for example, access policies, client certificates, authentication tokens, device postures of client devices, device history, user account history, and other information that can be for authentication.

In another embodiment, the storage 530, the memory 515, or both are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various functions described herein.

The network interface 540 allows the proxy 150 to communicate with other external devices. For example, the interface 540 is configured to allow the proxy 150 to communicate with a database (e.g., the database 119) or a server hosting the cloud-based application (e.g., the server 117).

In an embodiment, the network interface 540 allows remote access to the proxy 150 for the purpose of, for example, configuration, reporting, and the like. Such a connection, in an embodiment, can be realized through a web portal. The network interface 540 may include a wired connection or a wireless connection. The network interface 540 may transmit communication media, receive communication media, or both. For example, the network interface 540 may include a modem, a network interface card (NIC), an integrated network interface, a radio frequency transmitter/receiver, an infrared port, a USB connection, and the like.

The query processor 520 is configured to create a global tenant table including database tables of all tenants that can access a database. The query processor 520 is further configured to enforce cross-tenant isolation to a database. As discussed in greater detail above, the operation of the query processor 520 may include monitoring traffic to identify requests and responses to and from the database, processing the requests and responses in order to enforce access and retrieval of data from a designated table associate with a tenant in the global tenant table.

In an embodiment, the query processor 520 can be realized by one or more hardware logic components and circuits. For example, and without limitation, illustrative types of hardware logic components that can be used include FPGAs, ASICs, ASSPs, SOCs, CPLDs, general-purpose microprocessors, DSPs, and the like, or any other hardware logic components that can perform calculations or other manipulations of information.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for cross-tenant data leakage isolation in a multi-tenant database, comprising:
monitoring, by a proxy device, traffic flows between a server executing at least one cloud-based application and the multi-tenant database, wherein the proxy device is communicatively connected between the server and the multi-tenant database;
capturing, by the proxy device, at least a request to access the multi-tenant database, wherein the request is communicated using a database-specific protocol;
analyzing the request to determine if the request is illegitimate, wherein an illegitimate request is not addressed to a global-tenant table including records of individual database tables of tenants in the multi-tenant database;
upon determining that the request is not legitimate, modifying the request to point to a global-tenant table and to designate a condition with a unique tenant identifier having permissions to access the table identified in the received query, wherein the unique tenant identifier corresponds to a tenant-specific table name designated in the global-tenant table, and wherein the global-tenant table is shared across multiple machines; and
sending the modified request to the multi-tenant database using the database-specific protocol.

2. The method of claim 1, wherein analyzing the request further comprises:
identifying at least a query embedded in the request;
identifying a type of a command of the query; and
determining whether the command affects the global-tenant database.

3. The method of claim 2, wherein modifying the request further comprises:
upon determining that the query command affects the global-tenant database, changing the type of the command.

4. The method of claim 1, wherein the request is determined to be legitimate if the query embedded in the request is addressed to the global-tenant table and designates at least a unique tenant identifier as a condition.

5. The method of claim 1, further comprising:
capturing, by the proxy device, at least a response from the multi-tenant database, wherein the response including returned data;
analyzing the response to determine if the returned data relates to the global-tenant table;
upon determining that the returned data relates to the global-tenant table, modifying the response to designate at least one tenant-specific table name that the returned data belongs to; and
sending the modified response to the server.

6. The method of claim 1, wherein analyzing the response further comprises:
determining at least a query embedded in a request corresponding to the captured request;
identifying a type of a command of the query of the corresponding request; and
determining whether the command of the query of the corresponding request relates to the global-tenant database.

7. The method of claim 1, further comprising:
creating the global-tenant table.

8. The method of claim 7, further comprising:
associating a unique tenant identifier with each individual database table of tenants of the multi-tenant database;
joining all of the individual database tables of the tenants to create the global-tenant table; and
adding, to the global-tenant table, a column designating a tenant identifier of the tenant associated with each individual database table.

9. The method of claim 1, wherein the global-tenant table includes records of individual database tables of tenants in the multi-tenant database, wherein the record of each individual database tenant table is associated with a unique tenant identifier of a respective tenant.

10. The method of claim 1, further comprising:
performing at least one optimization process to optimize performance of accessing and maintaining the global-tenant database.

11. The method of claim 1, wherein the database specific protocol includes at least one of: a Wire protocol and a hypertext transfer protocol.

12. A non-transitory computer readable medium having stored thereon instructions for causing a processing circuitry to execute a method, the method comprising:
monitoring, by a proxy device, traffic flows between a server executing at least one cloud-based application and the multi-tenant database, wherein the proxy device is communicatively connected between the server and the multi-tenant database;
capturing, by the proxy device, at least a request to access the multi-tenant database, wherein the request is communicated using a database-specific protocol;
analyzing the request to determine if the request is illegitimate, wherein an illegitimate request is not addressed to a global-tenant table including records of individual database tables of tenants in the multi-tenant database;
upon determining that the request is not legitimate, modifying the request to point to a global-tenant table and to designate a condition with a unique tenant identifier having permissions to access the table identified in the received query, wherein the unique tenant identifier corresponds to a tenant-specific table name designated in the global-tenant table, and wherein the global-tenant table is shared across multiple machines; and
sending the modified request to the multi-tenant database using the database-specific protocol.

13. A proxy device for cross-tenant data leakage isolation in a multi-tenant database, the proxy device is communicatively connected between a server executing a cloud-based application and the multi-tenant database, comprising:
a processing circuitry; and
a memory, the memory containing instructions that, when executed by the processing circuitry, configure the proxy device to:
monitor traffic flows between the server and the multi-tenant database;
capture at least a request to access the multi-tenant database, wherein the request is communicated using a database specific protocol;
analyze the request to determine if the request is illegitimate, wherein an illegitimate request is not addressed to a global-tenant table including records of individual database tables of tenants in the multi-tenant database;

modify the request to point to a global-tenant table and designate a condition with a unique tenant identifier having permissions to access the table identified in the received query, upon determination that the request is not legitimate, wherein the unique tenant identifier corresponds to the tenant-specific table name designated in the global-tenant table, and wherein the global-tenant table is shared across multiple machines; and send the modified request to the multi-tenant database using the database specific protocol.

14. The proxy device of claim 13, wherein the proxy device is further configured to:

identify at least a query embedded in the request;

identify a type of a command of the query; and determine whether the query affects the global-tenant database.

15. The proxy device of claim 14, wherein the proxy device is further configured to:

change a type of the query, upon determination that the query affects the global-tenant database.

16. The proxy device of claim 13, wherein the request is determined legitimate if the query embedded in the request is addressed to the global-tenant table and designates a unique tenant identifier of the global-tenant table as a condition.

17. The proxy device of claim 13, wherein the proxy device is further configured to:

capture at least a response from the multi-tenant database, wherein the response including returned data;

analyze the response to determine if the returned data relates to the global-tenant table;

modify the response to designate at least one tenant-specific table name that the returned data belongs to, upon determination that the returned data relates to the global-tenant table; and send the modified response to the server.

18. The proxy device of claim 17, wherein the proxy device is further configured to:

determine at least a query embedded in a request corresponding to the captured request;

identify a type of a command of the query of the corresponding request; and determine whether the command of the query of the corresponding request relates to the global-tenant database.

19. The proxy device of claim 13, wherein the proxy device is further configured to:

create the global-tenant table.

20. The proxy device of claim 13, wherein the proxy device is further configured to:

associate a unique tenant identifier with each individual database table of tenants of the multi-tenant database;

join all of the individual database tables of the tenants to create the global-tenant table; and add, to the global-tenant table, a column designating a tenant identifier of the tenant associated with each individual database table.

21. The proxy device of claim 13, wherein the global-tenant table includes records of individual database tenant tables of tenants in the multi-tenant database, wherein the record of each individual database tenant table is associated with a unique tenant identifier of a respective tenant.

22. The proxy device of claim 13, wherein the proxy device is further configured to:

perform at least one optimization process to optimize performance of accessing and maintaining the global-tenant database.

* * * * *